United States Patent
Cao

(10) Patent No.: US 9,749,720 B2
(45) Date of Patent: Aug. 29, 2017

(54) RECEIVING DEVICE AND OPTICAL SWITCHING FABRIC APPARATUS

(71) Applicant: Huawei Technologies Co., Ltd., Shenzhen, Guangdong (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/938,614

(22) Filed: Nov. 11, 2015

(65) Prior Publication Data

US 2016/0066071 A1    Mar. 3, 2016

Related U.S. Application Data

(63) Continuation of application No. PCT/CN2013/075538, filed on May 13, 2013.

(51) Int. Cl.
*H04Q 11/00* (2006.01)
*H04J 14/02* (2006.01)
(Continued)

(52) U.S. Cl.
CPC .......... *H04Q 11/0003* (2013.01); *H04J 14/00* (2013.01); *H04J 14/02* (2013.01);
(Continued)

(58) Field of Classification Search
CPC .......... H04Q 11/0003; H04Q 11/0005; H04Q 2011/0007–2011/002; H04Q 2011/0033;
(Continued)

(56) References Cited

U.S. PATENT DOCUMENTS 5,005,166 A * 4/1991 Suzuki .................... H04J 14/00
398/47
5,208,691 A * 5/1993 Nishio ............... H04Q 11/0001
385/16
(Continued)

FOREIGN PATENT DOCUMENTS

CN         1318910 A      10/2001
CN       102318363 A       1/2012
(Continued)

OTHER PUBLICATIONS

Syuji Suzuki et al., "Photonic Wavelength-Division and Time-Division Hybrid Switching Networks for Large Line-Capacity Broadband Switching Systems", Proceedings of the Global Telecommunications Conference and Exhibition, vol. 2 of 3, No. 1988, Nov. 28, 1988, p. 0933-0937.
(Continued)

*Primary Examiner* — Li Liu

(57) ABSTRACT

The present invention provides a receiving device and an optical switching fabric apparatus, where the receiving device includes: multiple selecting modules, a fast optical switch connecting to each selecting module, an output module connecting to all the fast optical switches, and a receiver connecting to the output module, where the selecting module is configured to receive a multiwavelength optical signal, select and filter a first optical signal of a preset time segment in the multiwavelength optical signal; the fast optical switch is configured to select a second optical signal from the first optical signal filtered by the selecting module; the output module is configured to combine optical signals separately selected by all the fast optical switches into one optical burst signal; and the receiver is configured to perform optical-to-electrical conversion on the optical burst signal, and extract service data from an electrical signal.

14 Claims, 12 Drawing Sheets

(51) Int. Cl.
*H04J 14/08* (2006.01)
*H04J 14/00* (2006.01)

(52) U.S. Cl.
CPC .......... *H04J 14/08* (2013.01); *H04Q 11/0005* (2013.01); *H04Q 2011/002* (2013.01); *H04Q 2011/005* (2013.01); *H04Q 2011/0009* (2013.01); *H04Q 2011/0015* (2013.01); *H04Q 2011/0033* (2013.01); *H04Q 2011/0039* (2013.01); *H04Q 2011/0045* (2013.01)

(58) Field of Classification Search
CPC ... H04Q 2011/0039; H04Q 2011/0045; H04Q 2011/005; H04J 14/00; H04J 14/02; H04J 14/08
See application file for complete search history.

(56) References Cited

U.S. PATENT DOCUMENTS

| | | | | |
|---|---|---|---|---|
| 5,589,967 | A * | 12/1996 | Auffret | H04J 14/08 398/53 |
| 5,864,414 | A * | 1/1999 | Barnsley | H04J 14/0241 398/3 |
| 6,023,360 | A * | 2/2000 | Morioka | H04J 14/0223 398/1 |
| 6,307,658 | B1 * | 10/2001 | Chiaroni | H04J 14/08 398/183 |
| 6,356,371 | B1 * | 3/2002 | Chiaroni | H04J 14/08 398/102 |
| 6,452,681 | B1 * | 9/2002 | Carver | G01J 3/1895 356/450 |
| 6,721,315 | B1 * | 4/2004 | Xiong | H04L 49/254 370/389 |
| 7,095,959 | B2 * | 8/2006 | LoCascio | B82Y 5/00 385/16 |
| 7,590,110 | B2 | 9/2009 | Beshai et al. | |
| 7,729,572 | B1 * | 6/2010 | Pepper | G02B 6/12004 342/375 |
| 9,485,048 | B2 * | 11/2016 | Liboiron-Ladouceur | H04J 14/0223 |
| 2001/0021046 | A1 * | 9/2001 | Otani | H04J 14/0223 398/43 |
| 2004/0081386 | A1 * | 4/2004 | Morse | G02B 6/12007 385/15 |
| 2009/0003827 | A1 * | 1/2009 | Kai | H04J 14/0227 398/45 |
| 2009/0016738 | A1 * | 1/2009 | Von Lerber | H04L 7/0075 398/155 |
| 2009/0148115 | A1 * | 6/2009 | Lee | G02B 6/12007 385/132 |
| 2010/0098372 | A1 * | 4/2010 | Manipatruni | G02B 6/12007 385/2 |
| 2011/0097085 | A1 * | 4/2011 | Oda | H04B 10/2569 398/65 |
| 2011/0097090 | A1 * | 4/2011 | Cao | H04J 3/0658 398/154 |
| 2011/0206381 | A1 * | 8/2011 | Ji | H04J 14/08 398/140 |
| 2011/0293216 | A1 * | 12/2011 | Lipson | G02B 6/12007 385/14 |
| 2012/0045163 | A1 * | 2/2012 | Wu | G02F 1/225 385/2 |
| 2013/0195450 | A1 * | 8/2013 | Ashwood-Smith | H04Q 11/0005 398/49 |
| 2014/0140697 | A1 | 5/2014 | Cao | |
| 2014/0376921 | A1 * | 12/2014 | Goutzoulis | H04B 10/90 398/116 |

FOREIGN PATENT DOCUMENTS

| | | |
|---|---|---|
| CN | 102318364 A | 1/2012 |
| EP | 0 310 058 A2 | 4/1989 |
| EP | 2 731 285 A1 | 5/2014 |
| WO | WO 2012/119367 A1 | 9/2012 |

OTHER PUBLICATIONS

"Research on Ti:LiNbO3-Based Asymmetrical Electrode 1×2 Digital Optical Switch", May 2007, 91 pages.

* cited by examiner

RECEIVING DEVICE AND OPTICAL SWITCHING FABRIC APPARATUS

CROSS-REFERENCE TO RELATED APPLICATIONS

This application is a continuation of International Application No. PCT/CN2013/075538, filed May 13, 2013, which is hereby incorporated by reference in its entirety.

TECHNICAL FIELD

Embodiments of the present invention relate to communications technologies, and in particular, to a receiving device and an optical switching fabric apparatus.

BACKGROUND

Currently, an Optical Switching Fabric (Optical Switching Fabric, OSF for short) refers to an internal switching network of a router, a switch, an Optical Transport Network (Optical Transport Network, OTN for short) switching device, and the like. Generally, for ease of description, the OSF is divided into an optical switching matrix (Optical Switching Matrix, OSM for short) part for completing a switching function, and a control part for implementing switching scheduling or control.

A mainstream manner for supporting small-granularity switching in the OSM is still a time division switching (Time Division Switching, TDS for short) manner. The TDS includes using of an optical burst (Optical Burst, OB for short), an optical packet (Optical Packet, OP for short), or an optical cell (Optical Cell, OC for short). The so-called time division switching refers to a switching manner in which time is divided into several non-overlapping timeslots, different subchannels are established by using different timeslots, and service data is transmitted from an input point to an output point by using a timeslot switching network.

In a time division switching system, a switching speed of an optical component in the OSM determines a switching granularity. The switching speed of the optical component determines an interval length between optical bursts, and to ensure a specific bandwidth utilization rate (for example, to ensure a physical bandwidth utilization rate of 90%, an optical burst length must be about 10 times the interval length between the optical bursts), this also restricts the optical burst length, which thereby determines the switching granularity.

A finest switching granule may exist in a switching network of a routers or a switch, which generally requires implementation of switching at a granularity of a 64-byte cell (Cell). If an optical switching fabric apparatus is to be introduced to a router or a switch, the following is required:

In a case in which an interconnection line speed is 10 Gbps (Gbps, 10 bits per second), a switching granularity length (temporal) is: 64 Bytes×8/10 Gbps≈50 ns (ns, $10^{-9}$ second); and to ensure a relatively high bandwidth utilization rate (assuming that the switching granularity length is 10 times the interval, the physical bandwidth utilization rate is greater than 90%), an optical burst interval is 5 ns.

In a case in which an interconnection line speed is 25 Gbps, the switching granularity length is 20 ns, and the optical burst interval is 2 ns.

However, another requirement of the optical switching fabric apparatus used in a router or a switch is a capacity. With rapid growth of user traffic, a greater capacity of the optical switching fabric apparatus is also required.

Therefore, how to design an optical switching fabric apparatus with a large capacity and a relatively fast switching speed becomes an issue to be urgently solved currently.

SUMMARY

For the disadvantage in the prior art, embodiments of the present invention provide a receiving device and an optical switching fabric apparatus.

According to a first aspect, an embodiment of the present invention provides a receiving device, including:

at least two selecting modules, a fast optical switch connecting to each selecting module, an output module connecting to all fast optical switches, and a receiver connecting to the output module, where the selecting module is configured to receive a multiwavelength optical signal, filter a first optical signal of a set time segment from the multiwavelength optical signal, and send the first optical signal to the fast optical switch;

the fast optical switch is configured to select a second optical signal from the first optical signal filtered by the selecting module, and send the second optical signal to the output module;

the output module is configured to combine the second optical signals separately selected by all the fast optical switches into one optical burst signal, and send the optical burst signal to the receiver; and the receiver is configured to perform optical-to-electrical conversion on the optical burst signal to obtain an electrical signal, extract service data from the electrical signal, and output the service data.

With reference to the first aspect, in a first optional implementation manner, the first optical signals separately output by the at least two selecting modules partly overlap in the time; and the second optical signals output by at least two fast optical switches do not overlap in the time.

With reference to the first aspect and the foregoing possible implementation manner, in a second optional implementation manner, the at least two selecting modules are disposed in a serial manner.

With reference to the first aspect and the first optional implementation manner, in a third optional implementation manner, the method further includes: an input module, where the input module is separately connected to the at least two selecting modules; and the input module is configured to receive a multiwavelength optical signal sent by a wavelength broadcasting device in the optical switching fabric apparatus, split the multiwavelength optical signal into multiple multiwavelength optical signals, and input each multiwavelength optical signal to a corresponding selecting module, where the number of multiwavelength optical signals is the same as that of the selecting modules.

With reference to the first aspect and the third optional implementation manner, in a fourth optional implementation manner, the at least two selecting modules are disposed in a parallel manner.

With reference to the first aspect and the third and the fourth optional implementation manners, in a fifth optional implementation manner, the input module is a one-input multi-output splitter.

With reference to the first aspect and the foregoing possible implementation manners, in a sixth optional implementation manner:

the output module is a multi-input one-output combiner.

With reference to the first aspect and the foregoing possible implementation manners, in a seventh optional implementation manner:

the selecting module is a microring.

With reference to the first aspect and the foregoing possible implementation manners, in an eighth optional implementation manner, the method further includes:

a receiving clock generating module, where the receiving clock generating module is configured to generate an optical burst frame header clock that is to be used by the selecting module and the fast optical switch, so that the receiving device is synchronous with an optical burst frame header clock sent by a sending device in the optical switching fabric apparatus; and the receiving clock generating module is separately connected to each selecting module, and the receiving clock generating module is separately connected to each fast optical switch.

With reference to the first aspect and the foregoing possible implementation manner, in a ninth optional implementation manner, the receiving device includes a first selecting module and a second selecting module, a first fast optical switch connecting to the first selecting module, and a second fast optical switch connecting to the second selecting module;

correspondingly, when the first selecting module is connected to the second selecting module in parallel, the first selecting module splits, from the multiwavelength optical signal, an optical signal 1 corresponding to a time segment 1, and the second selecting module splits, from the multiwavelength optical signal, an optical signal 2 corresponding to a time segment 2;

when the first selecting module is connected to the second selecting module in series, the first selecting module splits, from the multiwavelength optical signal, the optical signal 1 corresponding to the time segment 1, and sends the remaining optical signal to the second selecting module, and the second selecting module splits, from the remaining optical signal, the optical signal 2 corresponding to the time segment 2;

the optical signal 1 partly overlaps with the optical signal 2 in the time, the optical signal 1 at least completely includes an optical signal 3 on a selected wavelength 1 and in a selected timeslot 1, the optical signal 2 at least completely includes an optical signal 4 on a selected wavelength 2 and in a selected timeslot 2, and the optical signal 3 does not overlap with the optical signal 4 in the time;

the first fast optical switch splits the optical signal 3 from the optical signal 1, and the second fast optical switch splits the optical signal 4 from the optical signal 2; and the output module combines the optical signal 3 and the optical signal 4 into one optical burst signal and outputs the optical burst signal to the receiver.

According to a second aspect, an embodiment of the present invention provides an optical switching fabric apparatus, including:

a sending device, a wavelength broadcasting device, and the receiving device, where the sending device is configured to receive an electrical signal that includes service data, convert the electrical signal into an optical signal by using a preconfigured wavelength, and send the optical signal to the wavelength broadcasting device;

the wavelength broadcasting device is configured to send the optical signal to the receiving device; and the receiving device is configured to acquire service data in the optical signal and output the service data.

With reference to the second aspect, in a first optional implementation manner, the apparatus further includes:

a clock source and a scheduling module, where the clock source is connected to the scheduling module, the scheduling module is connected to the wavelength broadcasting device, and the clock source is configured to generate a synchronous clock source of the optical switching fabric apparatus; and the scheduling module is configured to perform dynamic scheduling on the optical signal of the sending device, and configured to perform selection and reception, by the selecting device, in a timeslot specified by the scheduling module.

With reference to the second aspect, in a second optional implementation manner, the sending device includes:

a transmitter, configured to convert an electrical signal into an optical signal.

With reference to the second aspect and the first optional implementation manner, in a third optional implementation manner, the sending device includes:

a transmitter configured to convert an electrical signal into an optical signal; and a sending clock generating module, configured to track the synchronous clock source generated by the clock source, and generate a data clock that needs to be sent by the transmitter and an optical burst frame header clock that needs to be sent by the transmitter.

With reference to the second aspect, in a fourth optional implementation manner, the wavelength broadcasting device includes:

a combiner, an optical amplifying unit, and a first splitter, where the combiner is configured to receive optical signals sent by the at least two sending devices, combine the received optical signals to form the multiwavelength signal, and send the multiwavelength signal to the optical amplifying unit;

the optical amplifying unit is configured to receive the multiwavelength optical signal sent by the combiner, amplify the multiwavelength optical signal, and send an amplified multiwavelength optical signal to the first splitter; and the first splitter is configured to split the optical signal sent by the optical amplifying unit into multiple optical signals, and send each optical signal to a corresponding receiving device.

With reference to the second aspect and the first optional implementation manner, in a fifth optional implementation manner, the wavelength broadcasting device includes:

a combiner, an optical amplifying unit, a first splitter, and a second splitter, where the combiner is configured to receive optical signals sent by the at least two sending devices, combine the received optical signals to form the multiwavelength signal, and send the multiwavelength signal to the second splitter;

the second splitter is configured to split the multiwavelength optical signal sent by the combiner into two optical signals, where one multiwavelength optical signal is sent to the optical amplifying unit, and the other multiwavelength optical signal is sent to the scheduling module of the optical switching fabric apparatus;

the optical amplifying unit is configured to send, to the first splitter, the multiwavelength optical signal sent by the second splitter; and the first splitter is configured to receive an optical signal sent by the scheduling module and the multiwavelength optical signal of the optical amplifying unit, split the optical signal of the scheduling module and the multiwavelength optical signal sent by the optical amplifying unit into multiple multiwavelength optical signals, and send each multiwavelength optical signal to a corresponding receiving device.

It can be known from the foregoing technical solutions that, in the receiving device and the optical switching fabric apparatus in the embodiments of the present invention, multiple selecting modules, a fast optical switch connecting to each selecting module, an input module connecting to all fast optical switches, and a receiver connecting to the input module are disposed in the receiving device; therefore the optical switching fabric apparatus that includes the receiving device can solve a problem in the prior art that a capacity of an optical switching matrix is small or a switching speed cannot meet a requirement.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the present invention clearer, the following clearly describes the technical solutions of the present invention with reference to the accompanying drawings in the embodiments of the present invention. Apparently, the following described embodiments are a part of the embodiments of the present invention. Based on the embodiments of the present invention, persons of ordinary skill in the art can obtain other embodiments that can solve the technical problem of the present invention and implement the technical effect of the present invention by equivalently altering some or all the technical features even without creative efforts. Apparently, the embodiments obtained by means of alteration do not depart from the scope disclosed in the present invention.

In the prior art, a semiconductor optical amplifier (Semiconductor Optical Amplifier, SOA for short) optical switch is used to set up an optical switching fabric apparatus. A switching speed of an SOA is relatively fast and can reach a picosecond (ps, $10^{-12}$ second) level. However, the optical switching fabric apparatus set up by using the SOA is at a relatively poor integrated level.

At present, a largest scale of an SOA optical switch module for commercial use is 8×8 (namely, 8 inputs and 8 outputs). If a one-level switching architecture is used, the optical switching fabric apparatus set up by using the SOA optical switch has a relatively small scale, which can only implement an 8×8 scale; and if a multi-level switching architecture is used, the number of required SOA optical switch modules is excessively large, resulting in a relatively large volume and relatively large power consumption (in the multi-level switching architecture, the number of required basic switching units increases exponentially with the increase of a switching capacity)

Therefore, in the industry, a fast tunable laser (Fast Tunable Laser, FTL for short) with cyclic array waveguide gratings (cyclic Array Waveguide Gratings, c-AWG for short) is used to set up the optical switching fabric apparatus.

A main characteristic of the c-AWG is that different wavelength signals input through a same input port can be output through different output ports. A principle of signal switching implemented by the FTL plus the c-AWG is shown in FIG. 1.

Figure 1:
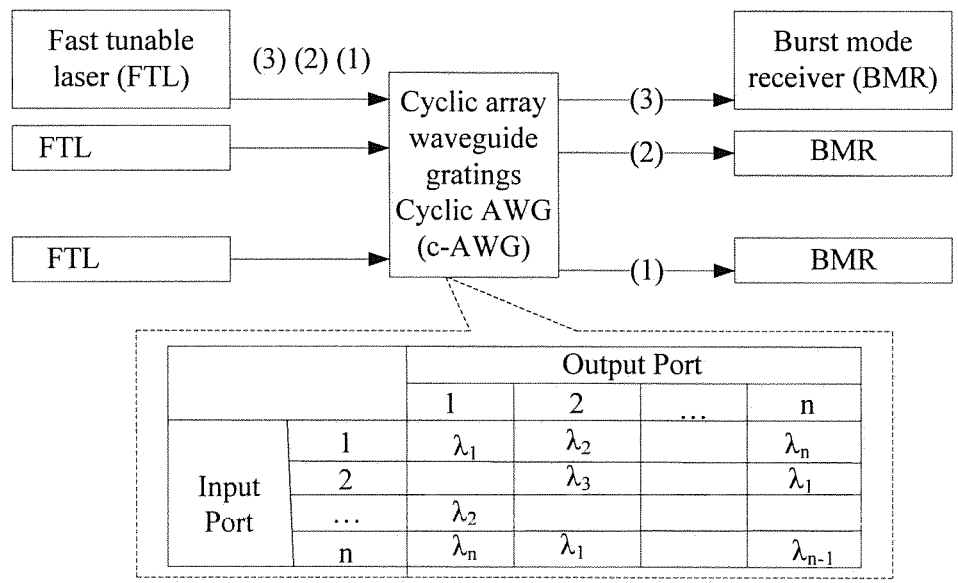
FIG. 1 is a principle diagram of an FTL and c-AWG in the prior art.

In FIG. 1, the FTL modulates different signals to different wavelengths. In this way, after the different signals go through the c-AWG, the different signals can be output through different output ports. A lower part of FIG. 1 shows an example of an input-output relationship of the c-AWG. Certainly, c-AWG with different input and output features may be designed according to a requirement. However, the main characteristic of the c-AWG is that different-wavelength signals input through a same input port can be output through different output ports.

At present, tunable wavelengths of most FTLs reach 80 to 90 waves (corresponding to a C band). The c-AWG can reach a maximum 80×80 scale. Therefore, in a manner of using the FTL and c-AWG, an 80×80 scale can be reached for a basic switching unit, so that an optical switching fabric apparatus with a large capacity can be set up.

However, setting up the optical switching fabric apparatus by using the FTL and c-AWG has the following disadvantage: a switching speed cannot meet a requirement of cell switching. At present, the switching speed of the FTL can generally reach only about 90 ns, which cannot meet a requirement of switching a 64-byte cell in a switching time of 2 ns to 5 ns.

Therefore, how to design an optical switching fabric apparatus with a relatively large capacity and a relatively fast switching speed becomes an issue to be solved currently.

In addition, it should be noted that an OB, an OP, and an OC that are described in the prior art are in a similar representation form in the time, but are different only in a duration length. In the embodiments of the present invention, for ease of description, the OB, the OP, and the OC are all referred to as the OB, content described in the embodiments of the present invention is applicable to the OB, the OP, and the OC, and the like.

In the embodiments of the present invention, by mainly setting modules in a receiving device, and an optical switching fabric apparatus that includes the receiving device, an optical module (for example, a transmitter) that can meet an wavelength division multiplexing (Wavelength Division Multiplexing, WDM for short) application standard is used in a sending part of the optical switching fabric apparatus to send service data, and multiple pieces of service data are sent to the receiving device by optical layer broadcasting (for example, by using a wavelength broadcasting device); and the receiving device filters, by using a fast tunable filter, required service data from a signal sent by optical layer broadcasting, so as to achieve a reception purpose.

The fast tunable filter in the embodiments may include: a selecting module, a fast optical switch, an output module, and the like, which are described in detail in the following Embodiment 1.

In a specific implementation process, a fast tunable filter module uses a two-level multi-path working mode, and the fast tunable filter may rapidly filter, from a multiwavelength signal, a cell that needs to be received (service data is encapsulated in the cell).

Embodiment 1

Figure 2A:
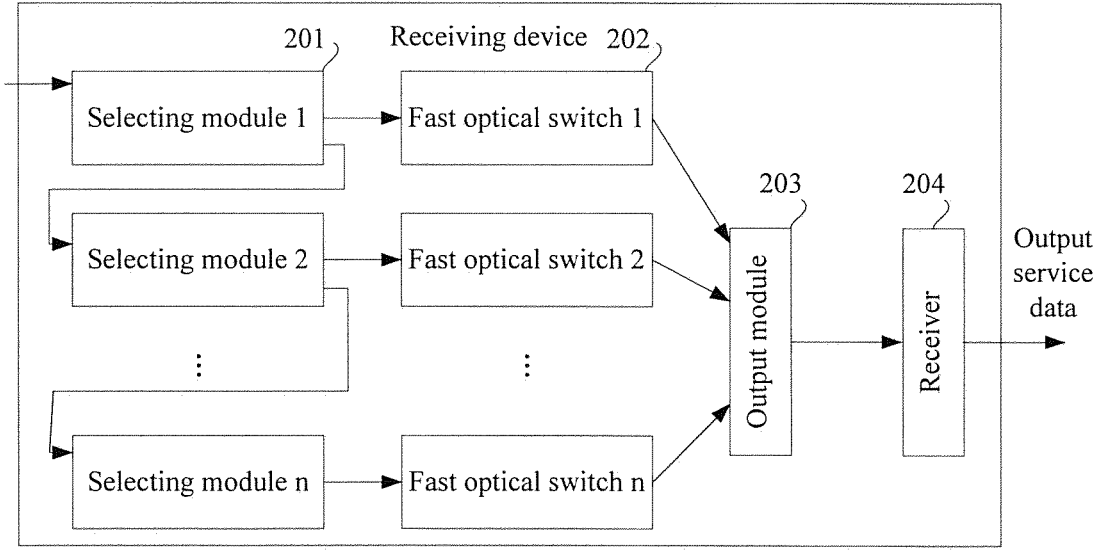
FIG. 2A is a schematic structural diagram of a receiving device according to an embodiment of the present invention.

FIG. 2A shows a schematic structural diagram of a receiving device according to an embodiment of the present invention. As shown in FIG. 2A, the receiving device of this embodiment includes: at least two selecting modules 201, a fast optical switch 202 connecting to each selecting module 201, an output module 203 connecting to all fast optical switches 202, and a receiver 204 connecting to the output module 203.

The selecting module 201 is configured to receive a multiwavelength optical signal, filter a first optical signal of a set time segment from the multiwavelength optical signal, and send the first optical signal to the fast optical switch 202.

The multiwavelength optical signal is broadcast by a wavelength broadcasting device in an optical switching fabric apparatus (namely, an output of the wavelength broadcasting device) (it should be noted that, if multiple selecting modules 201 are connected in series, the first selecting module is connected to the wavelength broadcasting device, and the remaining selecting modules are connected to a previous selecting module).

The fast optical switch 202 is configured to select a second optical signal from the first optical signal filtered by the selecting module 201, and send the second optical signal to the output module 203.

The output module 203 is configured to combine the second optical signals separately selected by all the fast optical switches 202 into one optical burst signal, and send the optical burst signal to the receiver 204.

The receiver 204 is configured to perform optical-to-electrical conversion on the optical burst signal to obtain an electrical signal, extract service data from the electrical signal, and output the service data.

In a specific application process, the first optical signals separately output by the at least two selecting modules may partly overlap in the time; and the second optical signals output by the at least two fast optical switches do not overlap in the time.

Particularly, in FIG. 2A, the at least two selecting modules 201 are disposed in a serial manner.

For example, if the number of selecting modules included in the receiving device is two (for example, a first selecting module and a second selecting module), the number of fast optical switches is also two (for example, a first fast optical switch and a second fast optical switch), and in this case, the first selecting module in this embodiment splits, from the multiwavelength optical signal, an optical signal 1 corresponding to a time segment 1.

The second selecting module splits, from the multiwavelength optical signal, an optical signal 2 corresponding to a time segment 2.

The optical signal 1 partly overlaps with the optical signal 2 in the time, the optical signal 1 at least completely includes an optical signal 3 on a selected wavelength 1 and in a selected timeslot 1, the optical signal 2 at least completely includes an optical signal 4 on a selected wavelength 2 and in a selected timeslot 2, and the optical signal 3 does not overlap with the optical signal 4 in the time.

The first fast optical switch splits the optical signal 3 from the optical signal 1, and the second fast optical switch splits the optical signal 4 from the optical signal 2.

The output module combines the optical signal 3 and the optical signal 4 into one optical burst signal, and outputs the optical burst signal to the receiver.

The receiver receives the optical burst signal output by the output module, performs optical-to-electrical conversion on the optical burst signal, and extracts service data 1 corresponding to the optical signal 3 and service data 2 corresponding to the optical signal 4. It should be understood that the optical signals 1 to 4 are all specific optical signals used as examples for description, and are not limited in this embodiment. The first optical signal and the second optical signal that are described above may be construed as general terms used for ease of description, where the first optical signal includes the optical signal 1, the optical signal 2, and the like, and the second optical signal includes the optical signal 3, the optical signal 4, and the like.

In this embodiment, the optical switching fabric apparatus that includes the receiving device can meet a current requirement of a router or a switch on a switching speed, that is, the optical switching fabric apparatus that uses the receiving device can support a relatively large capacity and a relatively fast switching speed.

Figure 2B:
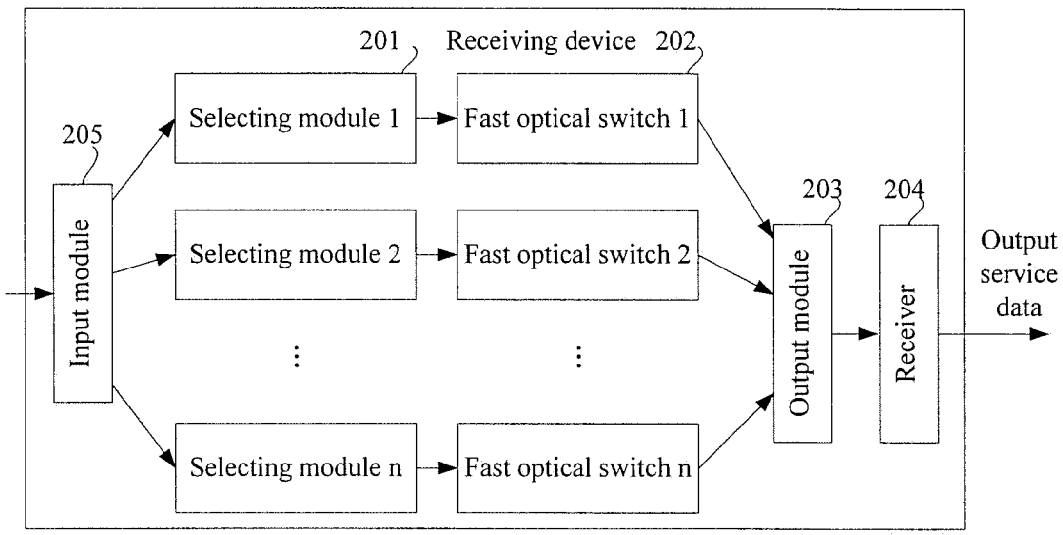
FIG. 2B is a schematic structural diagram of a receiving device according to another embodiment of the present invention.

In another optional embodiment, the receiving device of this embodiment may further include an input module 205. As shown in FIG. 2B, the input module 205 is separately connected to the at least two selecting modules.

The input module 205 is configured to receive a multiwavelength optical signal sent by the wavelength broadcasting device in the optical switching fabric apparatus, split the multiwavelength optical signal into multiple multiwavelength optical signals, and input each multiwavelength optical signal to a corresponding selecting module 201, where the number of multiwavelength optical signals is the same as that of the selecting modules 201.

The at least two selecting modules 201 in this embodiment are disposed in a parallel manner. For example, if the receiving device includes two selecting modules, for example, a first selecting module and a second selecting module, correspondingly, two fast optical switches are included, for example, a first fast optical switch and a second fast optical switch.

The first selecting module splits, from the multiwavelength optical signal that is output by the input module 205, the optical signal 1 corresponding to the time segment 1, and sends the remaining optical signal to the second selecting module; and the second selecting module splits, from the remaining optical signal, the optical signal 2 corresponding to the time segment 2.

The optical signal 1 partly overlaps with the optical signal 2 in the time, the optical signal 1 at least completely includes an optical signal 3 on a selected wavelength 1 and in a selected timeslot 1, the optical signal 2 at least completely includes an optical signal 4 on a selected wavelength 2 and in a selected timeslot 2, and the optical signal 3 does not overlap with the optical signal 4 in the time.

The first fast optical switch splits the optical signal 3 from the optical signal 1, and the second fast optical switch splits the optical signal 4 from the optical signal 2.

The output module combines the optical signal 3 and the optical signal 4 into one optical burst signal, and outputs the optical burst signal to the receiver.

The receiver receives the optical burst signal output by the output module, performs optical-to-electrical conversion on the optical burst signal, and extracts service data 1 corresponding to the optical signal 3 and service data 2 corresponding to the optical signal 4. It should be understood that the optical signals 1 to 4 are all optical signals used as examples for description, and are not limited in this embodiment.

Therefore, the optical switching fabric apparatus that includes the receiving device can meet a current requirement of a router or a switch on a switching speed.

In a specific application, the input module 205 in FIG. 2B may be a one-input multi-output splitter, where the number of outputs of the splitter is the same as the number of selecting modules.

The output module in FIG. 2A and FIG. 2B may be a multi-input one-output combiner, where the number of inputs of the combiner is the same as the number of fast optical switches.

Optionally, all the selecting modules in FIG. 2A and FIG. 2B may be microrings, for example, microrings fabricated by using InP (InP) or a polymer (Polymer) material, which are configured to filter any wavelength from an entire C band, and can control a tuning time within 10 ns, to match a cell length.

The fast optical switches in FIG. 2A and FIG. 2B may be implemented by using an SOA, so as to implement a ps-level switching speed.

Optionally, in a specific application, if an interconnection line speed is further increased, more selecting modules (for example, microrings) may be used in the receiving device, so as to reduce a switching time of the receiving device. An example is as follows:

If two selecting modules are used, at an interconnection line speed of 25 Gbps, a switching speed of 1 ns (supporting 64-byte cell switching) can be implemented, and a physical bandwidth utilization rate of over 90% can also be ensured.

If three selecting modules are used, at an interconnection line speed of 50 Gbps, a switching speed of 500 ps (supporting 64-byte cell switching) can be implemented, and a physical bandwidth utilization rate of over 90% can also be ensured.

Figure 2C:
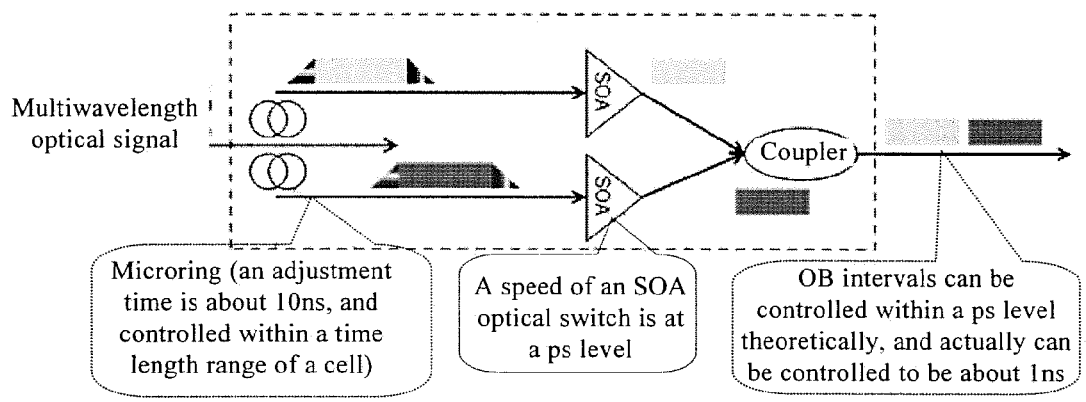
FIG. 2C is a part of a schematic structural diagram of a receiving device according to an embodiment of the present invention.

In any one of the foregoing specific application examples, as shown in FIG. 2C, the selecting module may be implemented by using a microring, and a single-wavelength signal (for example, the first optical signal described in FIG. 2A in Embodiment 1) may be filtered from a multiwavelength signal. (As described above, if the first optical signals filtered by multiple selecting modules overlap in the time, start and end parts of the single-wavelength signal or the first optical signal herein may also include a part of the multiwavelength optical signal, as shown in FIG. 2C). In this way, the number of microrings and a capacity of the entire optical switching fabric apparatus increase linearly. For example, to set up an 80×80 optical switching fabric apparatus, assuming that there are n selecting modules (which are generally corresponding to n microrings, where, however, one selecting module may also be implemented by using a multi-level microring, which is mainly for increasing an extinction ratio of filtering of the microring) in each receiving device (assuming that each receiving device is corresponding to only one receiver), the entire optical switching fabric apparatus needs 80×n microrings.

Compared with the prior art in which an optical switching fabric apparatus is set up by using only an SOA optical switch, it can be seen that the number of SOA optical switches used in the prior art increases exponentially with the increase of the capacity of the optical switching fabric apparatus.

However, by using the receiving device in the example of the foregoing embodiment, an optical switching fabric apparatus with a large capacity can be constructed by using a relatively small number of optical components; or, an optical switching fabric apparatus with a larger capacity can be supported in this embodiment of the present invention by using the same number of optical components as those used in the prior art.

In a specific application process, by using microring filtering, it is relatively difficult to reach a ps-level switching speed thereof. Therefore, in this embodiment of the present invention, multiple selecting modules are used. In this way, a restriction on a switching speed of each selecting module may be relaxed, and first optical signals filtered by each selecting module are also allowed for overlapping in the time (for example, the optical signal 1 and the optical signal 2 overlap in the time). Also based on this reason (the switching speed of the selecting module is relatively slow), a fast optical switch is connected behind each selecting module. The fast optical switch may be implemented by using an SOA, and the switching speed may reach a ps level. In this way, after undergoing fast on and off of fast optical switches, second optical signals output by the fast switches do not overlap in the time, an interval between adjacent second optical signals (for example, the optical signal 3 and the optical signal 4) may be relatively small, and a ps level can also be reached theoretically.

It can be understood that, in this embodiment of the present invention, the number of selecting modules is the same as the number of fast optical switches. Therefore, the number of fast optical switches also increases linearly with the increase of a switching capacity of the optical switching fabric apparatus, which is also advantageous to implement an optical switching fabric apparatus with a larger capacity. In conclusion, in this embodiment, the selecting module is designed to mainly support a larger switching capacity, and the fast optical switch is mainly used to support relatively fast switching. A combination of the two can implement an optical switching fabric apparatus with a relatively large capacity and a relatively fast switching speed.

Figure 2D:
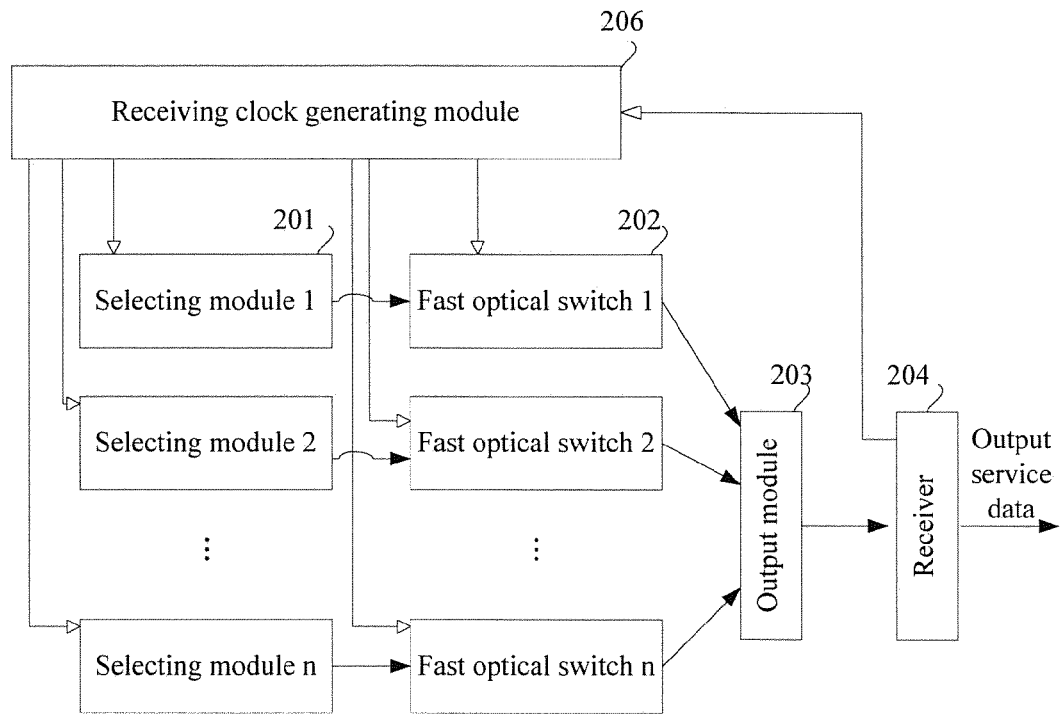
FIG. 2D is a part of a schematic structural diagram of a receiving device according to another embodiment of the present invention.

In a third embodiment, the receiving device shown in FIG. 2A and/or FIG. 2B may further include: a receiving clock generating module 206, as shown in FIG. 2D.

The receiving clock generating module 206 is configured to generate a header clock that is of a to-be-filtered optical burst frame and that is to be used by the selecting module 201 and the fast optical switch 202, so that the header clock of the receiving device is synchronous with an optical burst frame header clock sent by a sending device in the optical switching fabric apparatus.

A specific manner may be as follows: The selecting module 201 or the fast optical switch 202 is switched to an on state on a rising edge of the header clock of the to-be-filtered optical burst frame, starts to filter a first optical signal corresponding to the selecting module 201 or a second optical signal corresponding to the fast optical switch 202, and is switched to an off state on a falling edge of the header clock of the to-be-filtered optical burst frame, so as to complete filtering of the first optical signal or the second optical signal. Therefore, in a general case, phases of the header clocks that are of the to-be-filtered optical burst frames and generated by the receiving clock generating module 206 and sent to different selecting modules 201 are different (time points separately corresponding to the rising edge and the falling edge are different); similarly, in a general case, phases of the applicable header clocks that are of the to-be-filtered optical burst frames and generated by the receiving clock generating module 206 and sent to different fast optical switches 202 are also different. That is, the phase of each optical burst frame header clock needs be obtained according to scheduling authorization information corresponding to a scheduling module in the optical switching fabric apparatus, and then the selecting module and the fast optical switch are controlled to filter the first optical signal or the second optical signal at an appropriate time point.

In addition, in specific implementation, the header clock that is of the to-be-filtered optical burst frame and generated by the receiving clock generating module 206 needs to be sent in an allowed timeslot according to the scheduling authorization information. Therefore, the header clock of the to-be-filtered optical burst frame may not follow a fixed cycle.

The receiving clock generating module 206 is separately connected to each selecting module, and the receiving clock generating module is separately connected to each fast optical switch.

In this embodiment, the receiving clock generating module 206 mainly generates the header clock that is of the to-be-filtered optical burst frame and that is to be used by the selecting module and the fast optical switch module (the receiver 204 included in the receiving device is a burst mode receiver, and a data clock is extracted by the burst mode receiver itself). A specific implementation manner is that the receiving clock generating module 206 receives the optical burst frame header clock and the scheduling authorization information that are sent from the receiver, and then performs processing in a manner in the foregoing example.

The receiver 204 in FIG. 2D receives one optical burst signal, performs optical-to-electrical conversion on the optical burst signal, extracts and outputs service data, a received optical burst frame header clock, and scheduling authorization information, and sends the scheduling authorization information and the received optical burst frame header clock to the receiving clock generating module 206.

It should be understood that a clock processing part in the optical switching fabric apparatus that includes the receiving device may include a clock source, at least one sending clock generating module, and at least one receiving clock generating module.

The clock source is configured to generate a synchronous clock source of the optical switching fabric apparatus. In specific implementation, a synchronous clock source corresponding to the optical burst signal may be sent, for example, a implementation manner 1 of synchronous clock source shown in FIG. 2E (further, a pulse may also be sent at intervals of a fixed number of OBs on the basis of FIG. 2E according to a specific design of a method for transmitting scheduling authorization information, to form a synchronous optical burst frame header clock source, which is a implementation manner 2 of synchronous clock source shown in FIG. 2E). Apparently, a data clock used in the entire optical switching fabric may be obtained on the basis of the synchronous optical burst frame header clock source by means of frequency multiplication.

Figure 3A:
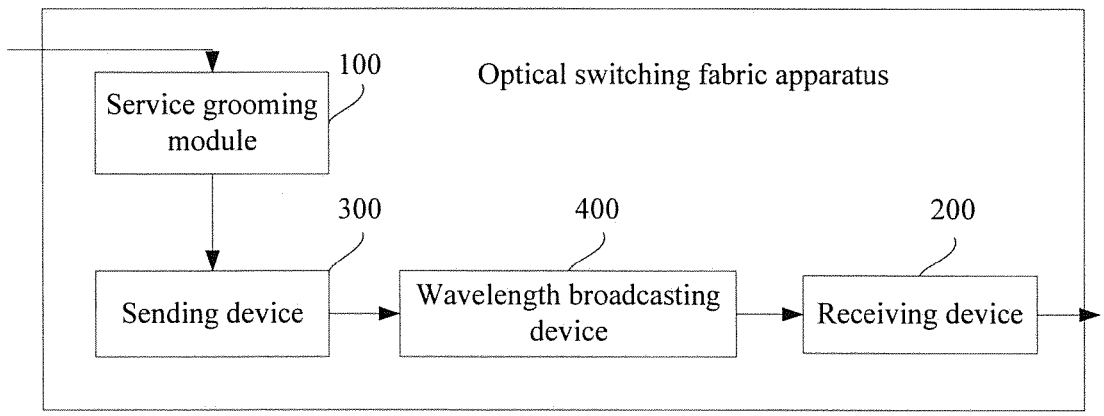
FIG. 3A is a schematic structural diagram of an optical switching fabric apparatus according to an embodiment of the present invention.
Figure 3B:
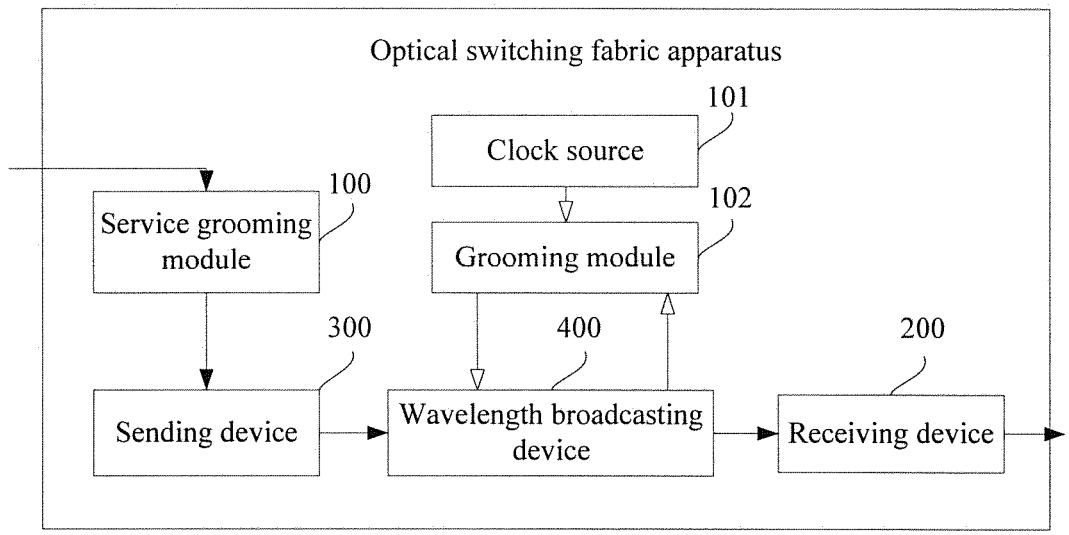
FIG. 3B is a schematic structural diagram of an optical switching fabric apparatus according to another embodiment of the present invention.
Figure 3C:
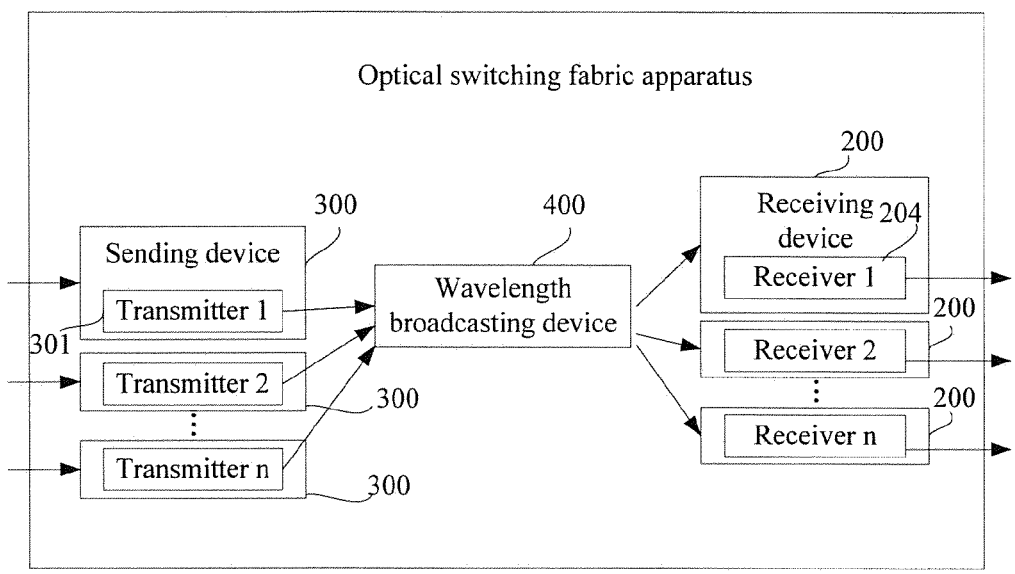
FIG. 3C is a schematic structural diagram of an optical switching fabric apparatus according to another embodiment of the present invention.
Figure 3D:
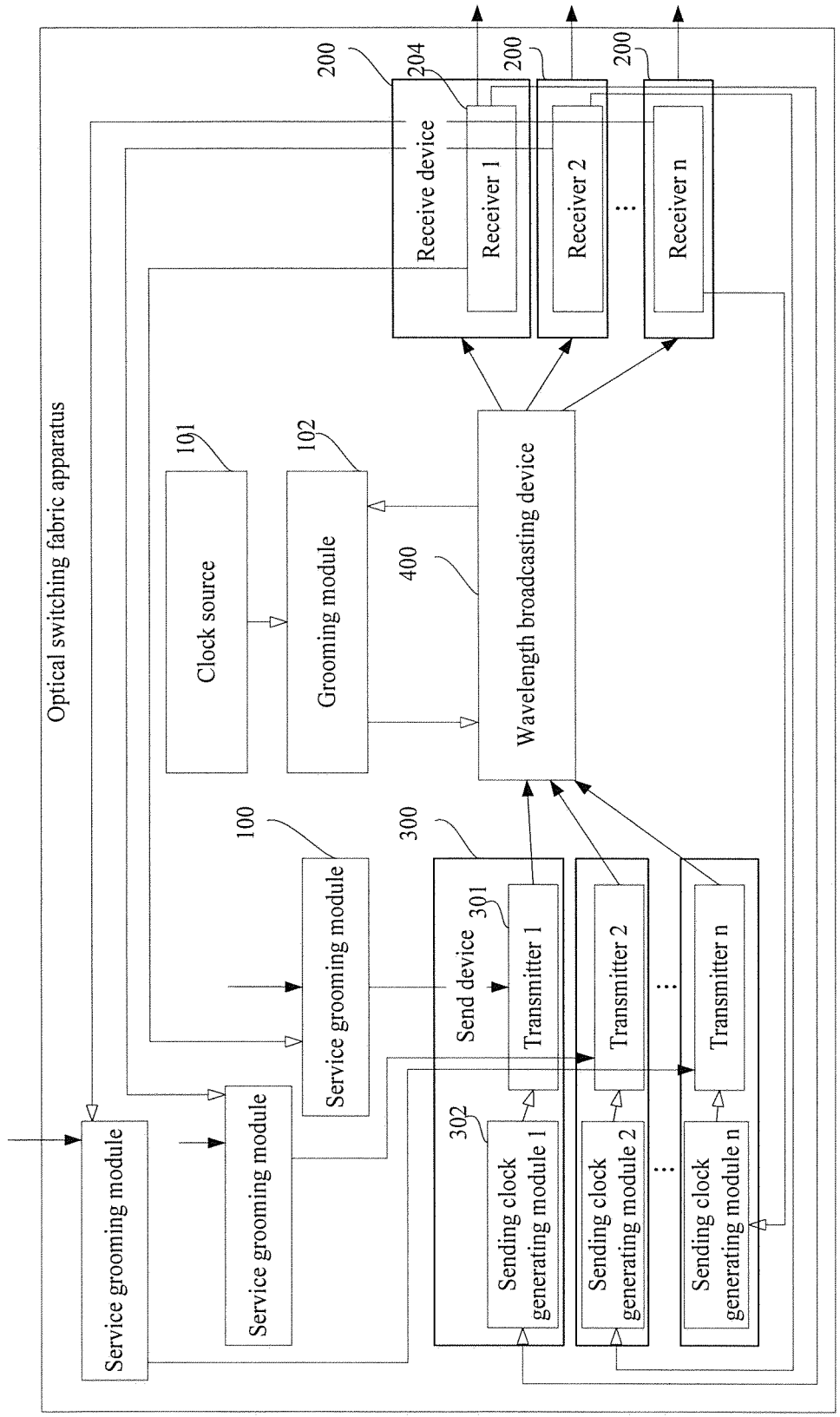
FIG. 3D to FIG. 3G are schematic structural diagrams of an optical switching fabric apparatus according to another embodiment of the present invention.
Figure 3E:
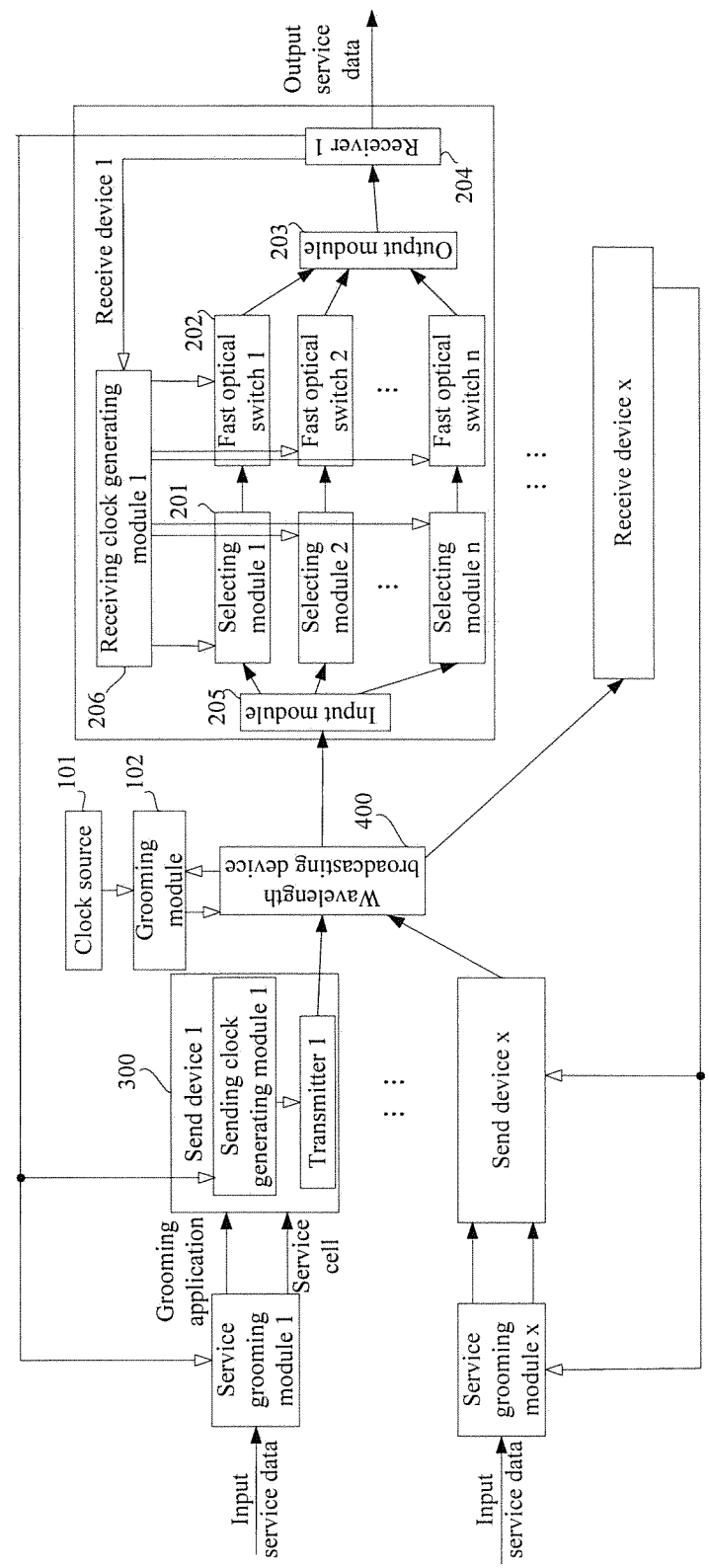
Figure 3F:
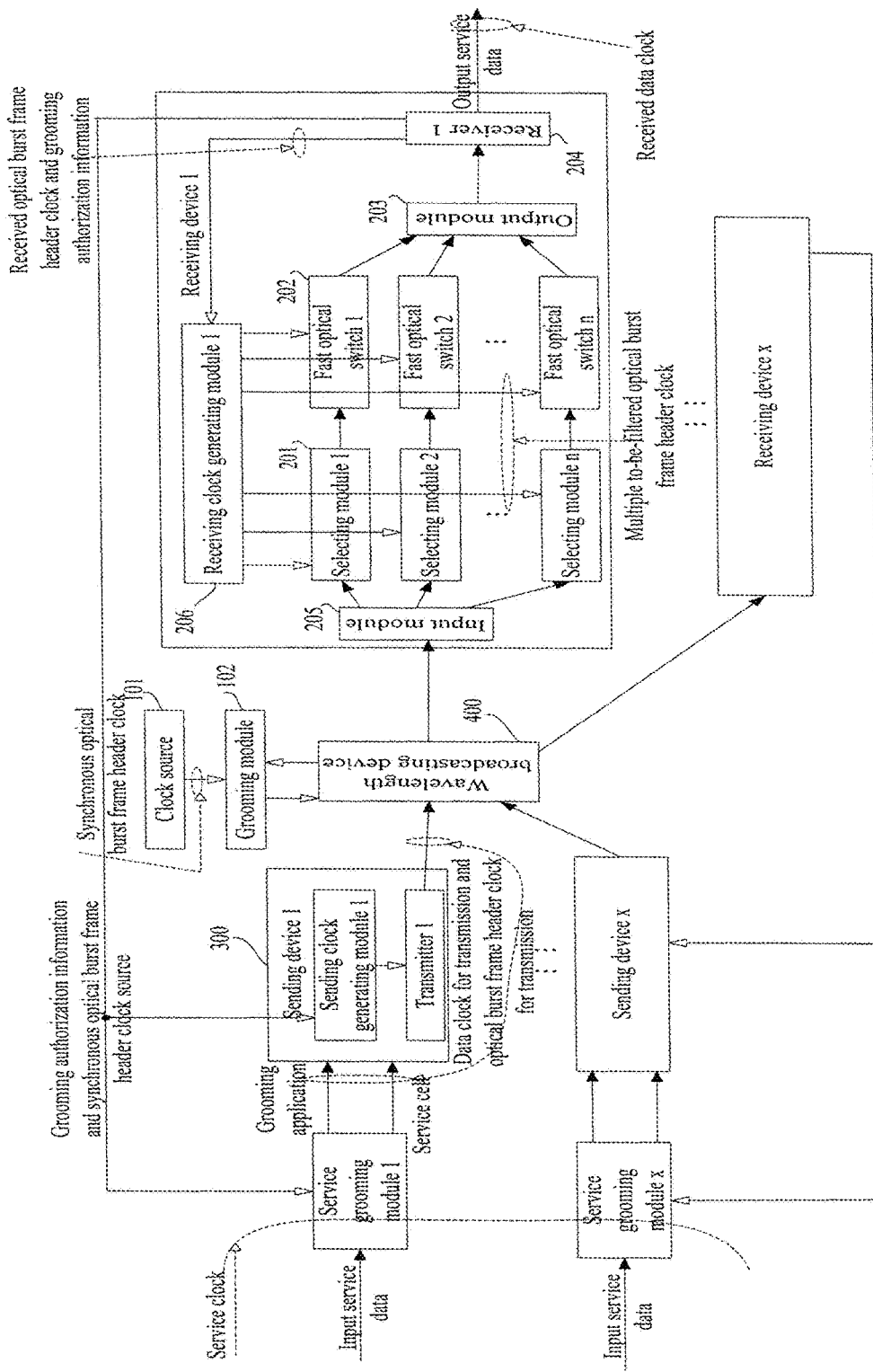

It can be understood that, in the foregoing synchronization manner, the optical switching fabric apparatus (except the service clock of the service scheduling module in FIG. 3F) may use a same clock domain, so as to implement clock frequency synchronization, and then the receiver in the receiving device in the receiving direction may receive an optical burst signal at intervals of about ins by performing phase adjustment only.

Embodiment 2

FIG. 3A shows a schematic structural diagram of an optical switching fabric apparatus according to an embodiment of the present invention. As shown in FIG. 2A, the optical switching fabric apparatus of this embodiment includes: a sending device 300, a wavelength broadcasting device 400, and a receiving device 200.

The sending device 300 is configured to receive an electrical signal that includes service data, convert the electrical signal into an optical signal by using a preconfigured wavelength, and send the optical signal to the wavelength broadcasting device 400.

The wavelength broadcasting device 400 is configured to send the optical signal to the receiving device 200.

The receiving device 200 is configured to acquire service data in the optical signal and output the service data.

In a specific implementation manner, the optical switching fabric apparatus further includes a service scheduling module 100, where the sending device 300 is configured to receive the electrical signal that includes service data and that is sent by the service scheduling module 100. It can be understood that the service scheduling module 100 in FIG. 3A is configured to receive service data input by a user, convert the service data into an electrical signal, and send the electrical signal to the sending device 300.

Optionally, FIG. 3B shows a schematic structural diagram of an optical switching fabric apparatus according to another embodiment of the present invention. As shown in FIG. 3B, the optical switching fabric apparatus of this embodiment includes: a service scheduling module 100, a sending device 300, a wavelength broadcasting device 400, and a receiving device 200, and further includes: a clock source 101, and a scheduling module 102.

The clock source 101 is connected to the scheduling module 102, and the clock source is configured to generate a synchronous clock source of the optical switching fabric apparatus.

The scheduling module 102 is connected to the wavelength broadcasting device 400, and is configured to perform dynamic scheduling on the optical signal of the sending device, and configured to perform selection and reception, by using the selecting device, in a timeslot specified by the scheduling module.

In this embodiment, a function of the scheduling module 102 is to control the service scheduling module 100 to encapsulate service data into an electrical signal (namely, a service cell), control the sending device 300 (for example, a transmitter) to convert the service cell into an optical signal in a timeslot specified by the scheduling module 102, send the optical signal to the wavelength broadcasting device 400, and control the receiving device 200 to perform selection and reception in the timeslot specified by the scheduling module 102.

In a third optional embodiment, the optical switching fabric apparatus in this embodiment is shown in FIG. 3C. The optical switching fabric apparatus in this embodiment is a detailed description of the optical switching fabric apparatus shown in FIG. 3A. In FIG. 3C, the sending device 300 includes a transmitter 301.

The transmitter 301 is configured to convert an electrical signal into an optical signal.

In a specific application process, one sending device may only include one transmitter. Correspondingly, one receiving device in the optical switching fabric apparatus that includes the sending device also only includes one receiver. In other embodiments, one sending device may also include multiple transmitters. Correspondingly, one receiving device in the optical switching fabric apparatus that includes the sending device may also include multiple receivers, and the number of the transmitters and the number of the receivers may be the same, or may be different.

In a general case, the number of the transmitters 301 and the number of the receivers 204 (as shown in FIG. 2A to FIG. 2B) in the receiving device 200 are the same. However, there is also an exception, for example, the number of transmitters is greater than the number of receivers, or the number of transmitters may be less than the number of receivers. FIG. 3C, FIG. 3D, and FIG. 3E are only examples for description. The number of transmitters in the sending device is not limited in this embodiment.

Particularly, the receiving device 200 in this embodiment may be the receiving device in FIG. 2A or the receiving device in FIG. 2B.

In a fourth optional embodiment, the optical switching fabric apparatus in this embodiment is shown in FIG. 3D. The optical switching fabric apparatus in this embodiment is a detailed description of the optical switching fabric apparatus shown in FIG. 3B. In FIG. 3D, the sending device 300 includes a transmitter 301, and further includes a sending clock generating module 302.

The transmitter 301 is configured to convert an electrical signal sent by the service scheduling module 100 into an optical signal.

In FIG. 3C and FIG. 3D, the number of the transmitters 301 and the number of the receivers 204 are the same. The foregoing accompanying drawings are merely examples for description. In other embodiments, the number of the transmitters 301 and the number of the receivers 204 may be the same, or may be different.

The sending clock generating module 302 is configured to track the synchronous clock source generated by the clock source 101, and generate a data clock that needs to be sent by the transmitter 301 and an optical burst frame header clock that needs to be sent by the transmitter 301. A specific implementation method may be as follows:

The receiver 204 in FIG. 3D receives one optical burst signal, performs optical-to-electrical conversion on the optical burst signal, extracts a synchronous optical burst frame header clock source and scheduling authorization information, sends the scheduling authorization information and the synchronous optical burst frame header clock source to the sending clock generating module 302 in the optical switching fabric apparatus, and sends the scheduling authorization information to the service scheduling module 100. In specific implementation, the scheduling authorization information and the synchronous optical burst frame header clock source sent by the receiver 204 to the sending clock generating module 302 may be borne in one signal, the scheduling authorization information and synchronous optical burst frame header clock source information may be set indifferent information locations of the signal, and the sending clock generating module 302 may extract the scheduling authorization information and the synchronous optical burst frame header clock source information from the signal. Actually, the service scheduling module 100 only requires the scheduling authorization information. Because the scheduling authorization information and the synchronous optical burst frame header clock source are borne in one signal, signals that are separately sent by the receiver 204 to the sending clock generating module 302 and the service scheduling module 100 and that are identified by FIG. 3D are the same. After receiving the synchronous optical burst frame header clock source, the sending clock generating module 302 may generate a data clock for transmission on the basis of the synchronous optical burst frame header clock source by using frequency multiplication, and the data clock for transmission is configured to generate a data bit stream. The sending clock generating module 302 may further perform processing, such as frequency locking (corresponding to manner 1 in FIG. 2E), frequency multiplication (corresponding to manner 2 in FIG. 2E), or phase shifting, on the basis of the synchronous optical burst frame header clock source according to the scheduling authorization information, and select an optical burst frame header clock pulse corresponding to a timeslot location (or an optical burst sequence number) specified by the scheduling authorization information, to form an optical burst frame header clock for transmission.

Each transmitter 301 is connected to one sending clock generating module 302; and the sending clock generating module 302 is connected to the receiver 204 in the receiving device of the optical switching fabric apparatus.

It can be understood that the clock that is required by the transmitter and generated by the sending clock generating module 302 mainly includes two clocks: one is a data clock for transmission, and the other is an optical burst frame header clock for transmission.

Based on the foregoing description, phase shifting processing needs to be performed on the optical burst frame header clock for transmission according to the synchronous optical burst frame header clock source received by the sending clock. A phase difference between the optical burst frame header clock for transmission and the synchronous optical burst frame header clock source needs to compensate a delay difference caused by a difference of optical fiber lengths between different transmitters 301 and the wavelength broadcasting device 400, that is, it needs to be ensured that optical burst frame header clocks sent by different transmitters 301 to the wavelength broadcasting device 400 are aligned.

For example, a specific implementation manner of the foregoing optical burst frame header clock for transmission may be as follows: A sequence number is written into an overhead of a optical burst; when starting distance measurement, the transmitter 301 records sending time of an OB of a sequence number, and then the receiver records time when writing an optical burst of a sequence number (the receiver 204 and the transmitter 301 are located on a same board). The difference between sending time and receiving time is 2 times (namely a round trip) a delay from the transmitter 301 to the wavelength broadcasting device 400.

As described above, the clock source 101 is connected to the wavelength broadcasting device 400 by using the scheduling module 102, a clock source coming from the clock source 101 and arriving at the transmitter 301 undergoes one time of delay, and an optical burst sent to the wavelength broadcasting device 400 by the transmitter 301 may further undergo one time of delay. Therefore, the transmitter 301 shifts a phase of the received clock source forward by two times of delay, so that it can be ensured that the optical burst frame header clocks are aligned when optical bursts sent by different transmitters 301 arrive at the wavelength broadcasting device 400.

Figure 2E:
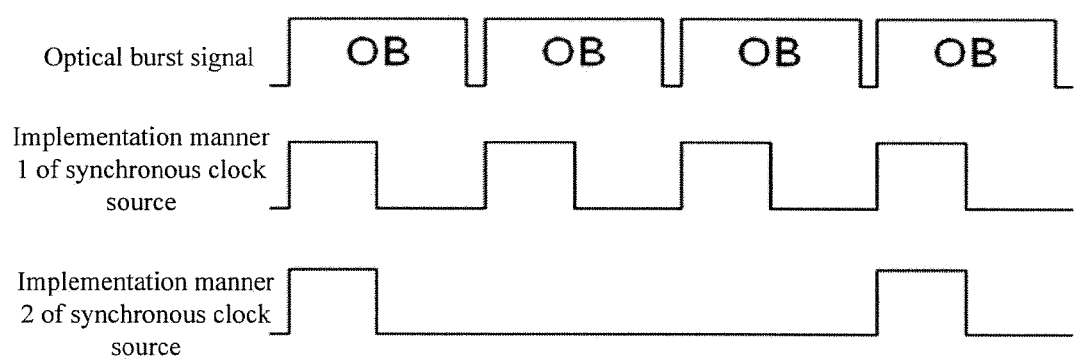
FIG. 2E is a schematic diagram of a synchronous clock source according to an embodiment of the present invention.

With reference to FIG. 2D, FIG. 2E, and FIG. 3D, a clock processing part in the optical switching fabric apparatus that includes the receiving device may include a clock source 101, at least one sending clock generating module 302, and at least one receiving clock generating module 206.

The clock source 101 provides a synchronous clock source of an entire optical switching fabric. In specific implementation, a synchronous clock source corresponding to an optical burst signal may be sent, as shown in FIG. 2E.

In specific implementation, the clock source 101 sends the synchronous clock source to the scheduling module 102, the scheduling module 102 modulates scheduling authorization information to a single wavelength by using a synchronous optical burst frame header clock source, to form a scheduling authorization information optical signal, and sends the scheduling authorization information optical signal to the wavelength broadcasting device 400, and the wavelength broadcasting device 400 sends the scheduling authorization information optical signal to each receiving device 200.

Each receiving device 200 performs reception in a fixed time segment, and extracts and sends the scheduling authorization information (an electrical signal) and the synchronous optical burst frame header clock source to the sending clock generating module 302, the receiving clock generating module, and the service scheduling module 100.

Delay differences from the wavelength broadcasting device 400 to different receiving devices 200 are absorbed by optical burst intervals. For example, at an interconnection line speed of 10 Gbps (that is, a bit rate of an interconnection signal is 10 Gbps), the optical burst interval may be controlled within 5 ns, and in this case, the delay differences from the wavelength broadcasting device 400 to different receiving devices 200 need to be controlled within 1 ns (corresponding to an optical fiber length difference of 0.2 m; to relax a restriction on the optical fiber difference, the optical burst intervals may be increased properly, that is, the bandwidth utilization rate is decreased). A margin is reserved according to an optical burst frame header of the receiver 204 in the receiving device 200, so that it can be ensured that the selecting module 201 and the fast optical switch 202 of the receiving device 200 operate correctly.

Correspondingly, the service scheduling module 100 of the optical switching fabric apparatus receives input service data, and generates a scheduling application signal according to a condition, such as input service data traffic, and sends the scheduling application signal to the transmitter 301 of the sending device 300; and the service scheduling module 100 encapsulates the input service data into a service cell according to the scheduling authorization information and sends the service cell to the transmitter 301.

The scheduling module 102 of the optical switching fabric apparatus receives, from the wavelength broadcasting device 400, scheduling application information sent by each transmitter 301 (referring to FIG. 3E or FIG. 3G, the scheduling application information is borne in a burst timeslot, and therefore the scheduling module 102 also needs to extract the scheduling application information in a manner that is used by the receiving device 200, that is, scheduling application information sent by multiple transmitters 301 needs to be extracted from multiple timeslots), generates the scheduling authorization information according to a scheduling algorithm, generates, according to a synchronous clock source sent by the clock source, a data clock for sending the scheduling authorization information, bears the scheduling authorization information on a preset wavelength to form a scheduling authorization information optical signal, and sends the scheduling authorization information optical signal to the wavelength broadcasting device 400.

Figure 3G:
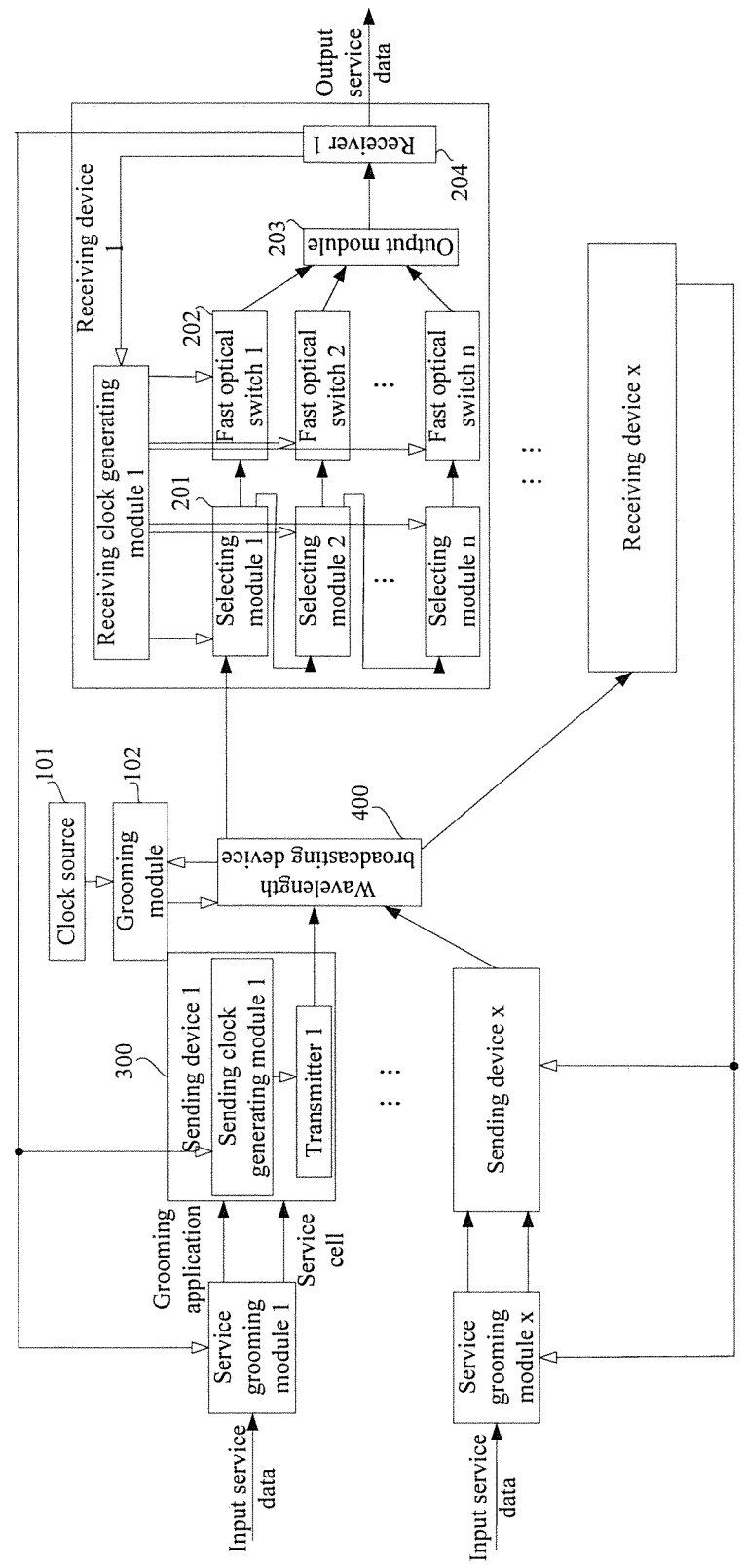
Figure 4A:
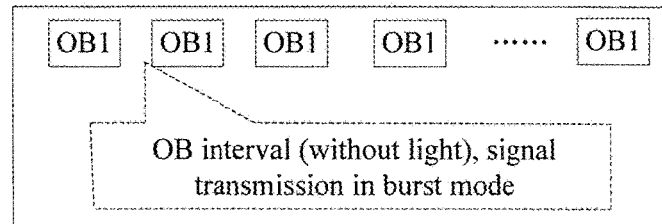
FIG. 4A and FIG. 4B are separately schematic diagrams of a single-wavelength optical signal according to an embodiment of the present invention.
Figure 4B:
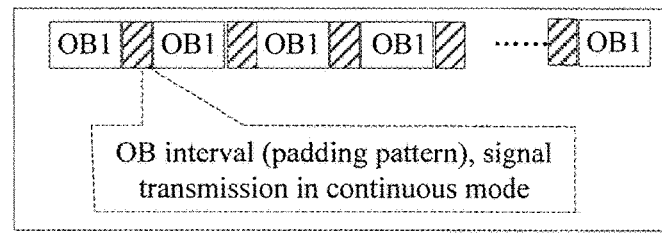

In FIG. 3E, FIG. 3F, and FIG. 3G, there are at least two sending devices, the transmitter 301 of the sending device 300 is configured to receive a service cell (which refers to a cell that bears service data) and a scheduling application, encapsulate the service cell and the scheduling application into different timeslots to form sending data for transmission, and modulate the sending data to a preset wavelength (different transmitters use different wavelengths) to form a single-wavelength optical signal, and send the single-wavelength optical signal to the wavelength broadcasting device 400. When the transmitter 301 sends the single-wavelength optical signal, a burst mode may be used, as shown in FIG. 4A; or a continuous mode may be used, as shown in FIG. 4B. When the continuous mode is used, fixed-pattern data (the fixed-pattern data has no specific meaning, and is generally for ensuring extraction of clock information) may be filled in intervals between valid data.

Figure 5A:
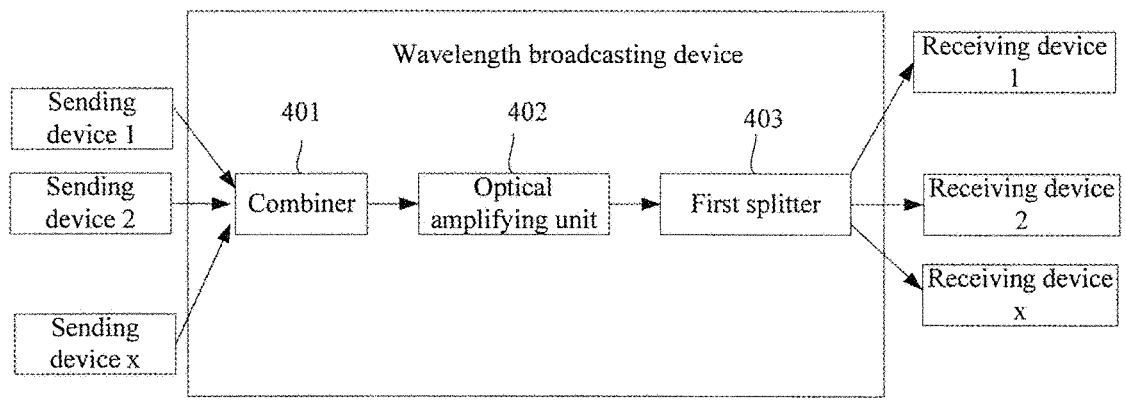
FIG. 5A is a schematic structural diagram of a wavelength broadcasting device in an optical switching fabric apparatus according to an embodiment of the present invention.
Figure 5B:
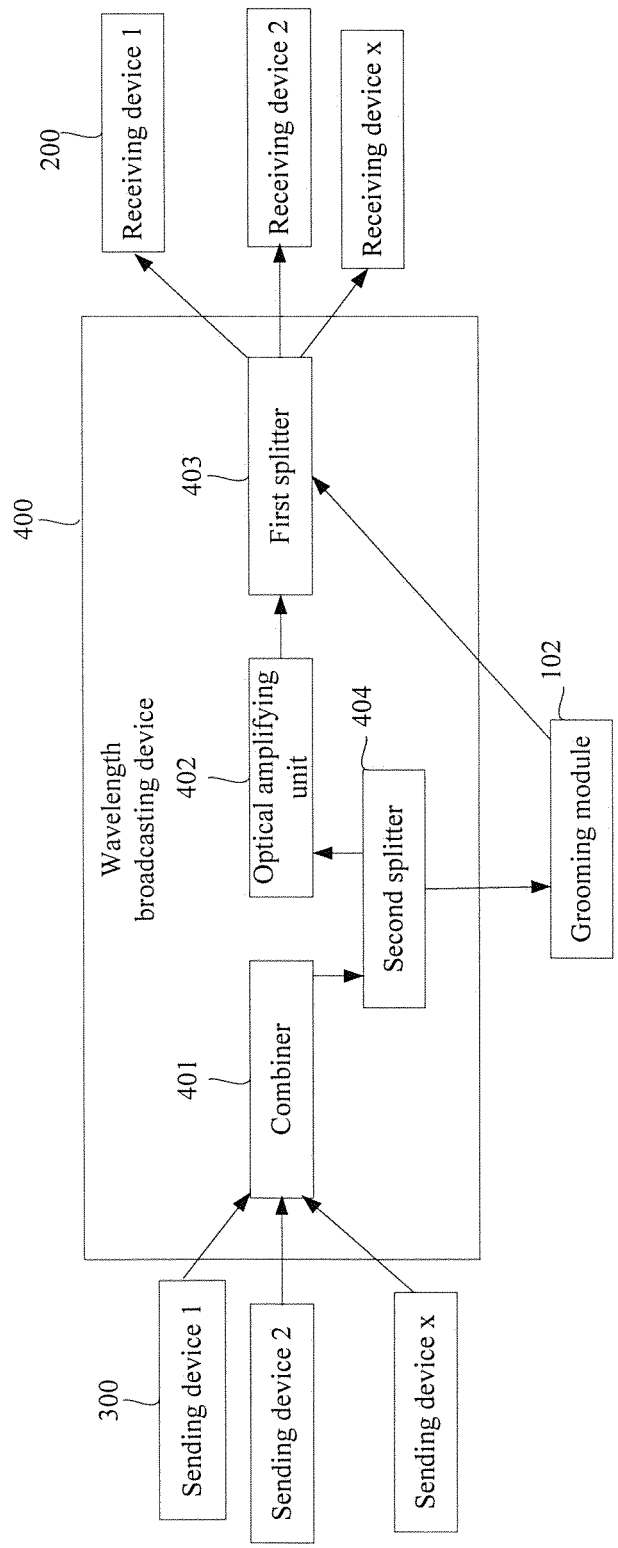
FIG. 5B is a schematic structural diagram of a wavelength broadcasting device in an optical switching fabric apparatus according to another embodiment of the present invention.
Figure 5C:
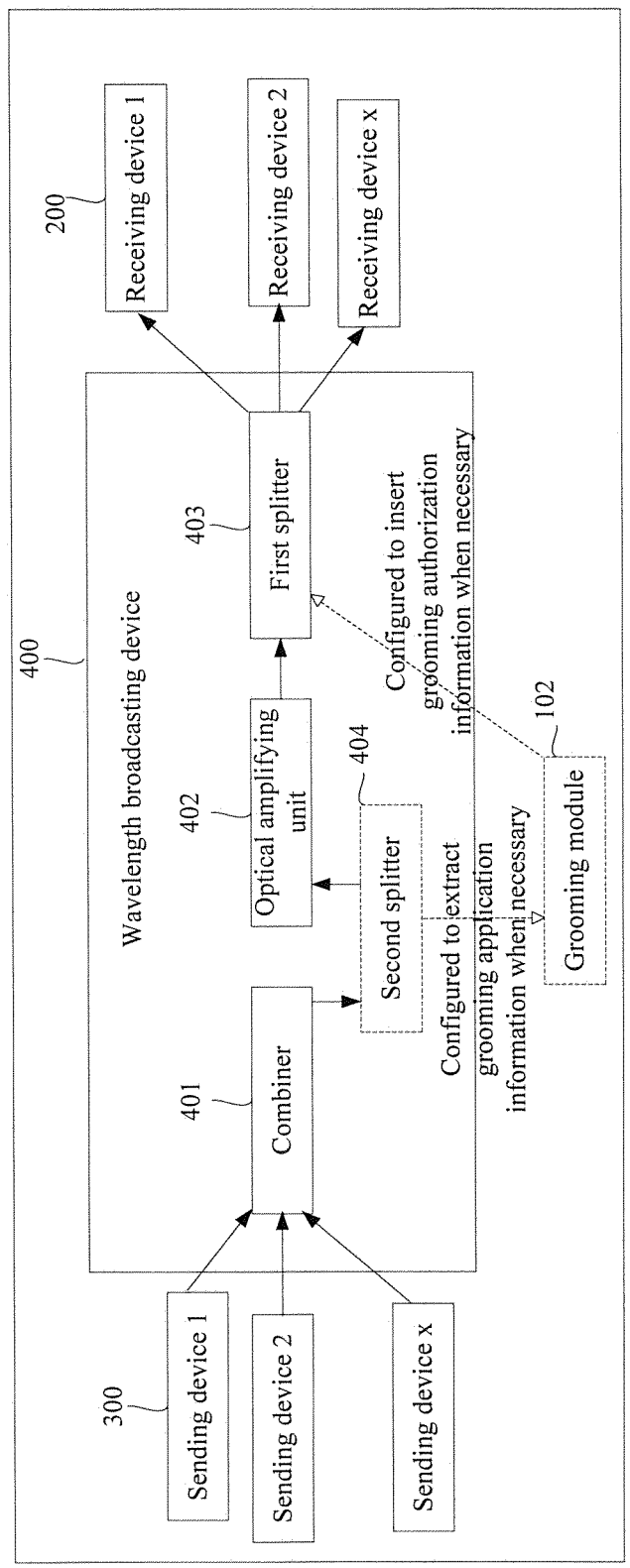
FIG. 5C is a schematic structural diagram of a wavelength broadcasting device in an optical switching fabric apparatus according to another embodiment of the present invention.

Correspondingly, the wavelength broadcasting device 400 sends multiple single-wavelength optical signals (multi-wavelength optical signal) sent by multiple transmitters 301 to each receiving device 200 (that is, each receiving device includes optical signals (which need to be processed by the wavelength broadcasting device) sent by all the transmitters); when dynamic scheduling (for example, when the solution is used inside a router) is required, the wavelength broadcasting device 400 is further responsible for combining the multiple single-wavelength optical signals sent by the multiple transmitters 301 to form a multiwavelength optical signal, splitting the multiwavelength optical signal into two multiwavelength optical signals by using a splitter, sending one multiwavelength optical signal to the scheduling module 102 (the other multiwavelength optical signal is to be sent to the receiving device), combining a scheduling authorization information optical signal generated by the scheduling module 102 and the other multiwavelength optical signal, and sending the combined signal to each receiving device 200, as shown in FIG. 5C.

In FIG. 3E, FIG. 3F, and FIG. 3G, a clock tracking path is as follows: synchronous optical burst frame header clock source—scheduling module—wavelength broadcasting device—receiving device—receiver in the receiving device—sending clock generating module in the sending device—transmitter in the sending device.

In an optional embodiment, as shown in FIG. 5A, the wavelength broadcasting device 400 may include: a combiner 401, an optical amplifying unit 402, and a first splitter 403.

The combiner 401 is configured to receive optical signals sent by the at least two sending devices 300, combine the received optical signals to form a multiwavelength optical signal, and send the multiwavelength optical signal to the optical amplifying unit 402, where the combiner may be an optical multiplexer or a coupler.

The optical amplifying unit 402 is configured to receive the multiwavelength optical signal sent by the combiner 401, amplify the multiwavelength optical signal, and send an amplified multiwavelength optical signal to the first splitter 403. It can be understood that the optical amplifying unit is mainly configured to amplify an optical signal, and compensate optical power loss caused by an optical component between the sending device and the receiving device; therefore, when a power budget between the sending device and the receiving device is sufficient, the optical amplifying unit may be omitted, and in this case, the combiner 401 is directly connected to the first splitter 403.

The first splitter 403 is configured to split the optical signal sent by the optical amplifying unit 402 into multiple optical signals, and send each optical signal to a corresponding receiving device 200.

It should be noted that the optical switching fabric apparatus including the wavelength broadcasting device 400, as shown in FIG. 5A, may be in a structure shown in FIG. 3A and FIG. 3C, where the optical switching fabric apparatus does not include the clock source 101, the scheduling module 102, the sending clock generating module 302 of the sending device, and the receiving clock generating module 206 of the receiving device.

It can be understood that, in an optional embodiment, the wavelength broadcasting device 400 may include: the combiner 401 and the first splitter 403, where the combiner 401 is directly connected to the first splitter 403.

In another optional embodiment, as shown in FIG. 5B or FIG. 5C, the wavelength broadcasting device 400 may include: a combiner 401, an optical amplifying unit 402, a first splitter 403, and a second splitter 404.

The combiner 401 is configured to receive optical signals sent by the at least two sending devices 300, combine the received optical signals to form the multiwavelength signal, and send the multiwavelength signal to the second splitter 404.

The second splitter 404 is configured to split the multiwavelength optical signal sent by the combiner 401 into two optical signals, where one multiwavelength optical signal is sent to the optical amplifying unit 402, and the other multiwavelength optical signal is sent to the scheduling module 102 of the optical switching fabric apparatus.

The optical amplifying unit 402 is configured to amplify the multiwavelength optical signal sent by the second splitter 404, and send an amplified multiwavelength optical signal to the first splitter 403.

The first splitter 403 is configured to receive an optical signal sent by the scheduling module 102 and the multiwavelength optical signal of the optical amplifying unit 402, split the optical signal of the scheduling module 102 and the multiwavelength optical signal sent by the optical amplifying unit 402 into multiple multiwavelength optical signals, and send each multiwavelength optical signal to a corresponding receiving device 200.

Certainly, in specific implementation, the scheduling module 102 of the optical switching fabric apparatus may include: one transmitter and one receiver; a simple embodiment may be as follows: Structures of the transmitter and the receiver are the same as or similar to corresponding parts in the sending device and the receiving device.

The scheduling module extracts scheduling application information (a timeslot in which the scheduling application information, sent by each transmitter, is located is preconfigured) from the multiwavelength optical signal (information included in this multiwavelength optical signal is the same as information in the multiwavelength optical signal sent by the second splitter to the optical amplifying unit, that is, besides the scheduling application information, the information further includes service data sent by each transmitter, and the scheduling module extracts only the scheduling application information) sent by the second splitter in FIG. 5B, and a method for receiving the scheduling application information is similar to that of the receiving device. After obtaining the scheduling application information, the scheduling module further obtains scheduling authorization information of each transmitter and receiver according to a preset scheduling algorithm, sequences the scheduling authorization information according to a preset timeslot location, uses an optical burst frame header clock (also including a data clock that is obtained on the basis of this by frequency multiplication, where a forming mechanism of the data clock is the same as a mechanism of the sending data clock generating module in the sending device) of the synchronous optical burst frame header clock source, and then sends the scheduling authorization information by using a single wavelength (generally, the optical signal sent in the sending device cannot change, and therefore another wavelength needs to be used for sending), where this wavelength once again combines with the multiwavelength optical signal that is sent by the optical amplifying unit and that includes the scheduling application information and the service data that are sent by each transmitter, to form a new multiwavelength optical signal, which is sent to each receiving device. Each receiving device extracts, on the preset timeslot, the scheduling authorization information that is sent by the scheduling module on that wavelength to perform an operation (scheduling authorization information in different receiving devices may be located in different timeslots, and arrangement of all these timeslots is preconfigured).

A receiving and sending part of the scheduling authorization information is similar to a corresponding part of the sending device and the receiving device, and the scheduling authorization information is generated according to the scheduling application information by using a scheduling algorithm.

It should be noted that the optical switching fabric apparatus including the wavelength broadcasting device 400, as shown in FIG. 5B, may be in a structure shown in FIG. 3B, FIG. 3D, FIG. 3E, and FIG. 3F, where the optical switching fabric apparatus includes the clock source 101, the scheduling module 102, the sending clock generating module 302 of the sending device, and the receiving clock generating module 206 of the receiving device, and the like.

If the optical switching fabric apparatus in the foregoing embodiment uses only a C band light source, it is relatively easy to implement 90 waves, that is, implement a 90×90 scale.

In an actual application, if a capacity is further increased, a range of a light source may be extended, for example, implementing a C+L band, and in this case, the capacity may be increased by one time. The light source may continue to be extended in a short-distance application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A receiving device, comprising:
   at least two selecting modules, each selecting module configured to receive a multiwavelength optical signal, filter a first optical signal of a set time segment from the multiwavelength optical signal, and output the first optical signal, wherein the first optical signals separately output by the at least two selecting modules partly overlap in time;
   a fast optical switch connected to each of the at least two selecting module, the fast optical switch configured to receive each respective first optical signal, select a second optical signal from each respective first optical signal filtered by the respective selecting module, and output the second optical signals, wherein the second optical signals output by the fast optical switch do not overlap in time;
   an output module connected to the fast optical switch, the output module configured to receive the second optical signals and combine the second optical signals separately selected by the fast optical switch into one optical burst signal, and output the optical burst signal;
   a receiver connected to the output module, the receiver configured to receive the optical burst signal, perform optical-to-electrical conversion on the optical burst signal to obtain an electrical signal, extract service data from the electrical signal, and output the service data; and
   a receiving clock generating module separately connected to each selecting module and separately connected to the fast optical switch, the receiving clock generating module configured to generate an optical burst frame header clock for use by the selecting module and the fast optical switch, based on a data clock received from the receiver, so that the receiving device is synchronous with an optical burst frame header clock sent by a sending device in an optical switching fabric apparatus.

2. The receiving device according to claim 1, wherein the at least two selecting modules are disposed in a serial manner.

3. The receiving device according to claim 1, further comprising:
   an input module separately connected to the at least two selecting modules, the input module configured to receive a multiwavelength optical signal sent by a wavelength broadcasting device in the optical switching fabric apparatus, split the multiwavelength optical signal into multiple multiwavelength optical signals, and input each multiwavelength optical signal to a corresponding selecting module, wherein the number of multiwavelength optical signals is the same as that of the selecting modules.

4. The receiving device according to claim 3, wherein the at least two selecting modules are disposed in a parallel manner.

5. The receiving device according to claim 3, wherein the input module is a one-input multi-output splitter.

6. The receiving device according to claim 1, wherein:
   the output module is a multi-input one-output combiner.

7. The receiving device according to claim 1, wherein:
   the selecting module is a microring.

8. The receiving device according to claim 1, wherein:
   the at least two selecting modules comprise a first selecting module and a second selecting module; and
   the fast optical switch comprises a first fast optical switch connected to the first selecting module and a second fast optical switch connected to the second selecting module;
   when the first selecting module is connected to the second selecting module in parallel, the first selecting module splits, from the multiwavelength optical signal, an optical signal corresponding to a first time segment, and the second selecting module splits, from the multiwavelength optical signal, an optical signal corresponding to a second time segment;
   when the first selecting module is connected to the second selecting module in series, the first selecting module splits, from the multiwavelength optical signal, the optical signal corresponding to the first time segment, and sends the remaining optical signal to the second selecting module, and the second selecting module splits, from the remaining optical signal, the optical signal corresponding to the second time segment;
   the optical signal corresponding to the first time segment partly overlaps with the optical signal corresponding to the second time segment in the time, the optical signal corresponding to the first time segment at least completely comprises an optical signal on a first selected wavelength and in a first selected timeslot, the optical signal corresponding to the second time segment at least completely comprises an optical signal on a second selected wavelength and in a second selected timeslot, and the optical signal on the first selected wavelength does not overlap with the optical signal on the second selected wavelength in the time;
   the first fast optical switch splits the optical signal on the first selected wavelength from the optical signal corresponding to the first time segment, and the second fast optical switch splits the optical signal on the second selected wavelength from the optical signal corresponding to the second time segment; and
   the output module combines the optical signal on the first selected wavelength and the optical signal on the second selected wavelength into one optical burst signal and outputs the optical burst signal to the receiver.

9. An optical switching fabric apparatus, comprising:
a sending device configured to receive an electrical signal comprising service data, convert the electrical signal into an optical signal by using a preconfigured wavelength, and output the optical signal;
a wavelength broadcasting device configured to receive the optical signal and output the optical signal; and
a receiving device according claim 1, the receiving device further configured to acquire service data in the optical signal and output the service data.

10. The apparatus according to claim 9, further comprising:
a clock source configured to generate a synchronous clock source of the apparatus; and
a scheduling module connected to the clock source and to the wavelength broadcasting device, the scheduling module configured to perform dynamic scheduling on the optical signal of the sending device, and perform selection and reception, by a service scheduling device, in a timeslot specified by the scheduling module.

11. The apparatus according to claim 10, wherein the sending device comprises:
a transmitter configured to convert an electrical signal into an optical signal; and
a sending clock generating module, configured to track the synchronous clock source generated by the clock source, and generate a data clock that needs to be sent by the transmitter and an optical burst frame header clock that needs to be sent by the transmitter.

12. The apparatus according to claim 10, wherein the wavelength broadcasting device comprises:
a combiner, an optical amplifying unit, a first splitter, and a second splitter, wherein
a combiner configured to receive optical signals sent by at least two sending devices, combine the received optical signals to form the multiwavelength optical signal, and output the multiwavelength optical signal;
a second splitter configured to receive and split the multiwavelength optical signal into at least a first and a second multiwavelength optical signal, wherein the first multiwavelength optical signal is sent to the optical amplifying unit, and the other multiwavelength optical signal is sent to the scheduling module of the optical switching fabric apparatus;
an optical amplifying unit configured to receive the first multiwavelength optical signal and output the first multiwavelength optical signal; and
a first splitter configured to receive the first multiwavelength optical signal and an optical signal output from the scheduling module, split the optical signal of the scheduling module and the first multiwavelength optical signal into multiple multiwavelength optical signals, and output each of the multiple multiwavelength optical signals to a corresponding receiving device.

13. The apparatus according to claim 9, wherein the sending device comprises:
a transmitter configured to convert an electrical signal into an optical signal.

14. The apparatus according to claim 9, wherein the wavelength broadcasting device comprises:
a combiner, an optical amplifying unit, and a first splitter, wherein
a combiner configured to receive optical signals sent by at least two sending devices, combine the received optical signals to form the multiwavelength signal, and output the multiwavelength signal; an optical amplifying unit configured to receive the multiwavelength optical signal, amplify the multiwavelength optical signal, and output an amplified multiwavelength optical signal; and
a first splitter configured to split the amplified multiwavelength optical signal into multiple optical signals, and send each optical signal to a corresponding receiving device.

* * * * *